United States Patent Office 3,409,629
Patented Nov. 5, 1968

3,409,629
SUBSTITUTED PYRIDINES
John H. Biel and Edward J. Warawa, Milwaukee, Wis., assignors to Aldrich Chemical Company, Inc., Milwaukee, Wis., a corporation of Wisconsin
No Drawing. Filed Sept. 15, 1964, Ser. No. 396,735
9 Claims. (Cl. 260—297)

ABSTRACT OF THE DISCLOSURE

Substituted pyridines having hypocholesteremic activity are useful for lowering blood cholesterol levels.

This invention relates to novel compounds. More particularly, this invention relates to novel compounds which possess valuable utility as hypocholesteremic agents. In another aspect, this invention relates to a novel method of lowering blood cholesterol level.

It is an object of this invention to provide a new class of chemical compounds. It is another object of the present invention to provide novel compounds having hypocholesteremic activity. It is a further object of the present invention to provide a novel method of lowering blood cholesterol level.

These and other objects which may appear as the specification proceeds are achieved by this invention which comprises the provision of compounds selected from the group consisting of compounds having the following formula (I)

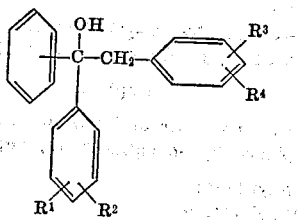

and the pharmaceutically acceptable nontoxic salts thereof. In Formula I, $R^1$ is trifluoromethyl;

$R^2$, $R^3$ and $R^4$ each represent a member selected from the group consisting of hydrogen, chloro, bromo, iodo, fluoro, trifluoromethyl, (lower)alkyl, (lower)alkoxy, (lower)alkylthio, di(lower)alkylamino, di(lower)alkylsulfamyl, methylenedioxy, (lower)alkanoyl, phenyl, phenoxy, benzyl and cycloalkyl radicals having from 5 to 7 carbon atoms inclusive, e.g. cyclopentyl, cyclohexyl and cycloheptyl.

The pharmaceutically acceptable nontoxic salts include the organic and inorganic acid addition salts, e.g., those prepared from acids such as hydrochloric, sulfuric, sulfamic, tartaric, fumaric, hydrobromic, hydriodic, glycolic, citric, maleic, phosphoric, succinic, acetic, nitric and the like.

The term "(lower)alkyl" as used herein means both straight and branched chain alkyl radicals containing from 1 to 8 carbon atoms, e.g. methyl, ethyl, propyl, isopropyl, butyl, isobutyl, t-butyl, amyl, hexyl, 2-ethylhexyl, etc.

Similarly, where the term "(lower)" is used as part of the description of another group, e.g., (lower)alkoxy, it refers to the alkyl portion of such group which is therefore as described in connection with (lower) alkyl.

Preferred compounds of the present invention are those having the following formula (II)

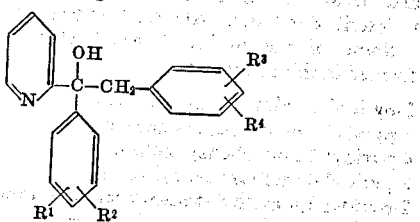

wherein $R^1$, $R^2$, $R^3$ and $R^4$ are as described above.

More preferred compounds of the present invention are those having the following formula (III)

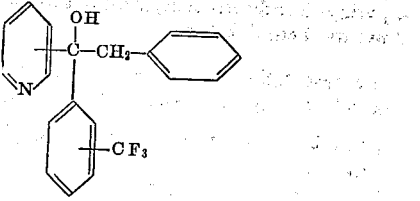

Still more preferred compounds of the present invention are those having the following formula (IV)

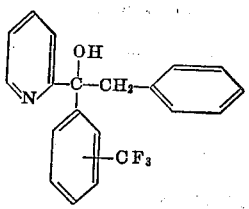

The compounds of this invention are valuable pharmaceutical agents. They produce a reduction in the serum cholesterol level which makes the compounds useful as hypocholesteremic agents. Thus, the compounds can be used for the treatment of hypercholesteremia.

The compounds of the present invention are produced in the following manner. The tertiary alcohols of Formula I are prepared by the reaction of a benzyl pyridyl ketone of the formula (V)

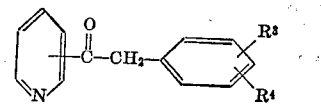

wherein $R^3$ and $R^4$ are as represented above, with a Grignard reagent, i.e., an aryl magnesium halide of the formula (VI)

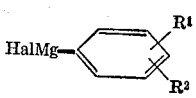

wherein Hal is chloro, bromo or iodo, and $R^1$ and $R^2$ are as represented above, or an organo-lithium compound of the formula (VII)

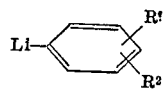

wherein $R^1$ and $R^2$ are as represented above. The reaction is carried out in the presence of an inert solvent, e.g., tetrahydrofuran, at reflux temperature. Such procedures are described in the following references: Chem. Abstr.

57:8540h, 8541a; J. Am. Chem. Soc. 79:472 (1957); J. Am. Chem. Soc. 76:2431 (1954); and J. Med. Chem. 7:113 (1964).

The pyridyl benzyl ketones may be prepared by reacting a pyridyl carboxylic acid ester with a phenylacetonitrile followed by hydrolysis of the nitrile to the acid and decarboxylation of the keto acid Such a procedure is described in Chem. Abstr. 57:8540h.

Some of the pyridyl benzyl ketones which may be formed in this manner are 2-pyridyl 4-chlorobenzyl ketone,
3-pyridyl 3-bromobenzyl ketone,
4-pyridyl 2-fluorobenzyl ketone,
2-pyridyl 4-methoxybenzyl ketone,
2-pyridyl 3,4-methylenedioxybenzyl ketone,
2-pyridyl 3,4-dichlorobenzyl ketone,
2-pyridyl 3-methoxy-4-chlorobenzyl ketone,
4-pyridyl 3-methoxy-4-chlorobenzyl ketone,
3-pyridyl 3-trifluoromethyl-4-phenylbenzyl ketone,
4-pyridyl 3-trifluoromethylbenzyl ketone and
2-pyridyl benzyl ketone.

Representative of the tertiary alcohols of this invention which may be produced in the foregoing manner are 1-(2-pyridyl)-1-(3-trifluoromethylphenyl)-2-phenylethanol,
1-(3-pyridyl)-1-(3-trifluoromethylphenyl)-2-phenylethanol,
1-(4-pyridyl)-1-(3-trifluoromethylphenyl)-2-phenylethanol,
1-(2-pyridyl)-1-(4-trifluoromethylphenyl)-2-phenylethanol,
1-(3-pyridyl)-1-(3-trifluoromethylphenyl)-2-(4-chlorophenyl)ethanol,
1-(4-pyridyl)-1-(4-trifluoromethylphenyl)-2-phenylethanol,
1-(4-pyridyl)-1-(3-trifluoromethylphenyl)-3-(4-chlorophenyl)-ethanol,
1-(2-pyridyl)-1-(2-trifluoromethylphenyl)-2-(4-chlorophenyl)-ethanol,
1-(4-pyridyl)-1-(3-trifluoromethylphenyl)-2-(4-tolyl)-ethanol,
1-(2-pyridyl)-1-(3-trifluoromethylphenyl)-2-(4-chlorophenyl)ethanol,
1-(2-pyridyl)-1-(3-trifluoromethylphenyl)-2-(4-methoxyphenyl)ethanol,
1-(4-pyridyl)-1-(3-trifluoromethylphenyl)-2-(4-methoxyphenyl)ethanol,
1-(2-pyridyl)-1-(3-trifluoromethylphenyl)-2-(4-bromophenyl)ethanol,
1-(2-pyridyl)-1-(3-trifluoromethyl-4-chlorophenyl)-2-phenylethanol and
1-(4-pyridyl)-1-(3-trifluoromethylphenyl)-2-(4-trifluoromethylphenyl)ethanol.

The starting materials used in the processes described herein are compounds which are either commercially available, well-known in the art, or easily prepared in accordance with standard organic procedures previously described in the chemical literature.

The compounds of this invention may be administered as the free bases or in the form of their nontoxic addition salts. They may be compounded and formulated into pharmaceutical preparations in unit dosage form for oral or parenteral administration with organic or inorganic solid materials or liquids which are pharmaceutically acceptable carriers. The compositions may take the form of tablets, powder granules, capsules, suspensions, solutions and the like. Such compositions are considered within the scope of this invention.

The compositions of this invention when administered orally or parenterally in an effective amount are effective in the treatment of hypercholesterolemia.

The following examples are intended to illustrate the invention described herein without unduly restricting it.

Example 1.—Preparation of 1-(2-pyridyl)-1-(3-trifluoromethylphenyl)-2-phenylethanol

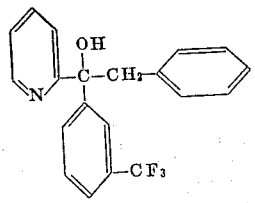

3-trifluoromethylphenyl magnesium bromide was prepared by adding 7.9 gm. of magnesium and 70.9 gm. of 3-trifluoromethylbromo-benzene to ether, 2-pyridyl benzene ketone (59.1 gm.) was then added dropwise and refluxed overnight. After cooling, 100 ml. of ice water was added, the supernatant liquid was decanted, and the residue was filtered through "Celite" (diatomaceous earth). The filtered material was then stirred with more ether, and filtered (3 times). Ether was removed from the combined ether extract in vacuo, and the residue was extracted with methylene chloride, dried, and filtered. Removal of solvent left a residue which was crystallized from hot heptane. The solid was treated with 23 gm. (0.15 mol) of Girard T reagent in 230 ml. ethanol and 23 ml. acetic acid. After refluxing for 2 hours, the solution was cooled, made alkaline with sodium hydroxide solution, and extracted with methylene chloride, dried, and filtered. Removal of solvent left 75.4 gm. of the product, 1-(2-pyridyl) - 1-(3-trifluoromethylphenyl)-2-phenylethanol. The product was found not to contain the carbonyl group by infrared analysis.

The product was converted to the hydrochloride salt with gaseous hydrogen chloride in ethanol. The hydrochloride salt of 1-(2-pyridyl)-1-(3-trifluoromethylphenyl)-2-phenylethanol after recrystallization from isopropanol had a melting point of 197–200° C., and the following elemental analysis.

*Analysis.*—Calcd. for $C_{20}H_{17}NOClF_3$: C, 63.30; H, 4.52; N, 3.70; Cl, 9.35. Found: C, 63.33; H, 4.52; N, 3.75.

Example 2

When, in the procedure of Example 1, 2-pyridyl benzyl ketone is replaced by an equal molar amount of 3-pyridyl benzyl ketone,
4-pyridyl benzyl ketone,
2-pyridyl-4-trifluoromethylbenzyl ketone,
3-pyridyl-4-chlorobenzyl ketone,
2-pyridyl-2-bromobenzyl ketone,
2-pyridyl-3-iodobenzyl ketone,
2-pyridyl-2,4-dichlorobenzyl ketone,
2-pyridyl-4-fluorobenzyl ketone,
2-pyridyl-3-trifluoromethylbenzyl ketone,
4-pyridyl-4-methylbenzyl ketone,
2-pyridyl-3-methylbenzyl ketone,
2-pyridyl-4-ethylbenzyl ketone,
3-pyridyl-2-butylbenzyl ketone,
2-pyridyl-3-methoxybenzyl ketone,
2-pyridyl-2,6-dimethylbenzyl ketone,
2-pyridyl-4-methylthiobenzyl ketone,
3-pyridyl-4-trifluoromethylbenzyl ketone,
2-pyridyl-3-cyclohexylbenzyl ketone,
2-pyridyl-4-phenylbenzyl ketone,
3-pyridyl-4-phenoxybenzyl ketone,
2-pyridyl-4-benzylbenzyl ketone,
2-pyridyl-2-acetylbenzyl ketone,
2-pyridyl-3-dimethylsulfamylbenzyl ketone,
3-pyridyl-2,3-methylenedioxybenzyl ketone,
4-pyridyl-3-dimethylaminobenzyl ketone,
2-pyridyl-2-ethoxybenzyl ketone,
2-pyridyl-3-cyclopentylbenzyl ketone and
2-pyridyl-2-methyl-4-trifluoromethylbenzyl ketone,
respectively, there are obtained, 1-(3-pyridyl-1-(3-trifluoromethylphenyl)-2-phenylethanol, 1-(4-pyridyl)-1-(3-trifluoromethylphenyl)-2-phenylethanol,
1-(2-pyridyl)-1-(3-trifluoromethylphenyl)-2-(4-trifluoromethylphenyl)ethanol,
1-(3-pyridyl)-1-(3-trifluoromethylphenyl)-2-(4-chlorophenyl)ethanol,
1-(2-pyridyl)-1-(3-trifluoromethylphenyl)-2-(2-bromophenyl)ethanol,
1-(2-pyridyl)-1-(3-trifluoromethylphenyl)-2-(3-iodophenyl)ethanol,
1-(2-pyridyl)-1-(3-trifluoromethylphenyl)-2-(2,4-dichlorophenyl)ethanol,
1-(2-pyridyl)-1-(3-trifluoromethylphenyl)-2-(4-fluorophenyl)ethanol,
1-(2-pyridyl)-1-(3-trifluoromethylphenyl)-2-(3-trifluoromethylphenyl)ethanol,
1-(4-pyridyl)-1-(3-trifluoromethylphenyl)-2-(4-methylphenyl)ethanol,
1-(2-pyridyl)-1-(3-trifluoromethylphenyl)-2-(3-methylphenyl)ethanol,
1-(2-pyridyl)-1-(3-trifluoromethylphenyl)-2-(4-ethylphenyl)ethanol,
1-(3-pyridyl)-1-(3-trifluoromethylphenyl)-2-(2-butylphenyl)ethanol,
1-(2-pyridyl)-1-(3-trifluoromethylphenyl)-2-(3-methoxyphenyl)ethanol,
1-(2-pyridyl)-1-(3-trifluoromethylphenyl)-2-(2,6-dimethylphenyl)ethanol,
1-(2-pyridyl)-1-(3-trifluoromethylphenyl)-2-(4-methylthiophenyl)ethanol,
1-(3-pyridyl)-1-(3-trifluoromethylphenyl)-2-(4-trifluoromethylphenyl)ethanol,
1-(2-pyridyl)-1-(3-trifluoromethylphenyl)-2-(3-cyclohexylphenyl)ethanol,
1-(2-pyridyl)-1-(3-trifluoromethylphenyl)-2-(4-phenylphenyl)ethanol,
1-(3-pyridyl)-1-(3-trifluoromethylphenyl)-2-(4-phenoxyphenyl)ethanol,
1-(2-pyridyl)-1-(3-trifluoromethylphenyl)-2-(4-benzylphenyl)ethanol,
1-(2-pyridyl)-1-(3-trifluoromethylphenyl)-2-(2-acetylphenyl)ethanol,
1-(2-pyridyl)-1-(3-trifluoromethylphenyl)-2-(3-dimethylsulfamylphenyl)ethanol,
1-(3-pyridyl)-1-(3-trifluoromethylphenyl)-2-(2,3-methylenedioxyphenyl)ethanol,
1-(4-pyridyl)-1-(3-trifluoromethylphenyl)-2-(3-dimethylaminophenyl)ethanol,
1-(2-pyridyl)-1-(3-trifluoromethylphenyl)-2-(2-ethoxyphenyl)ethanol,
1-(2-pyridyl)-1-(3-trifluoromethylphenyl)-2-(3-cyclopentylphenyl)ethanol and
1-(2-pyridyl)-1-(3-trifluoromethylphenyl)-2-(2-methyl-4-trifluoromethylphenyl)ethanol, respectively.

Example 3

When, in the procedure of Example 1, 3-trifluoromethylphenyl magnesium bromide is replaced by an equal molar amount of 2-trifluoromethylphenyl magnesium bromide,
4-trifluoromethylphenyl magnesium bromide,
3,4-ditrifluoromethylphenyl magnesium bromide,
3-trifluoromethyl-4-chlorophenyl magnesium bromide,
3-trifluoromethyl-4-bromophenyl magnesium bromide,
2-trifluoromethyl-4-iodophenyl magnesium bromide,
2-trifluoromethyl-3-fluorophenyl magnesium bromide,
3-methyl-4-trifluoromethylphenyl magnesium bromide,
2-propyl-3-trifluoromethylphenyl magnesium bromide,
3-trifluoromethyl-4-ethylphenyl magnesium bromide,
2-trifluoromethyl-3,4-methylenedioxyphenyl magnesium bromide,
3-trifluoromethyl-4-methoxyphenyl magnesium bromide,
2-trifluoromethyl-4-acetylphenyl magnesium bromide,
2-phenoxy-4-trifluoromethylphenyl magnesium bromide,
2-chloro-3-trifluoromethylphenyl magnesium bromide,
2-methyl-3-trifluoromethylphenyl magnesium bromide,
3-methylthio-4-trifluoromethylphenyl magnesium bromide,
2-trifluoromethyl-4-dimethylaminophenyl magnesium bromide,
2-chloro-4-trifluoromethylphenyl magnesium bromide,
3-trifluoromethyl-4-dimethylsulfamylphenyl magnesium bromide,
3-trifluoromethyl-4-phenylphenyl magnesium bromide,
3-trifluoromethyl-4-benzylphenyl magnesium bromide,
2-trifluoromethyl-3-cycloexylphenyl magnesium bromide,
2-cycloheptyl-4-trifluoromethylphenyl magnesium bromide and
3-trifluoromethyl-4-fluorophenyl magnesium bromide, respectively, there are obtained, 1-(2-pyridyl)-1-(2-trifluoromethylphenyl)-2-phenylethanol,
1-(2-pyridyl)-1-(4-trifluoromethylphenyl)-2-phenylethanol,
1-2-(pyridyl)-1-3,4-(ditrifluoromethylphenyl)-2-phenylethanol,
1-(2-pyridyl)-1-(3-trifluoromethyl-4-chlorophenyl)-2-phenylethanol,
1-(2-pyridyl)-1-(3-trifluoromethyl-4-bromophenyl)-2-phenylethanol,
1-(2-pyridyl)-1-(2-trifluoromethyl-4-iodophenyl)-2-phenylethanol,
1-(2-pyridyl)-1-(2-trifluoromethyl-3-fluorophenyl-2-phenylethanol,
1-(2-pyridyl-1-(3-methyl-4-trifluoromethylphenyl)-2-phenylethanol,
1-(2-pyridyl)-1-(2-propyl-3-trifluoromethylphenyl)-2-phenylethanol,
1-(2-pyridyl)-1-(3-trifluoromethyl-4-ethylphenyl)-2-phenylethanol,
1-(2-pyridyl)-1-(2-trifluoromethyl-3,4-methylenedioxyphenyl)-2-phenylethanol,
1-(2-pyridyl)-1-(3-trifluoromethyl-4-methoxyphenyl)-2-phenylethanol,
1-(2-pyridyl)-1-(2-trifluoromethyl-4-acetylphenyl)-2-phenylethanol,
1-(2-pyridyl)-1-(2-phenoxy-4-trifluoromethylphenyl)-2-phenylethanol,
1-(2-pyridyl)-1-(2-chloro-3-trifluoromethylphenyl)-2-phenylethanol,
1-(2-pyridyl)-1-(2-methyl-3-trifluoromethylphenyl)-2-phenylethanol,
1-(2-pyridyl)-1-(3-methylthio-4-trifluoromethylphenyl)-2-phenylethanol,
1-(2-pyridyl)-1-(2-trifluoromethyl-4-dimethylaminophenyl)-2-phenylethanol,
1-(2-pyridyl)-1-(2-chloro-4-trifluoromethylphenyl)-2-phenylethanol,
1-(2-pyridyl)-1-(3-trifluoromethyl-4-dimethylsulfamylphenyl)ethanol
1-(2-pyridyl)-1-(3-trifluromethyl-4-phenylphenyl)-2-phenylethanol,
1-(2-pyridyl)-1-(3-trifluoromethyl-4-benzylphenyl)-2-phenylethanol,
1-(2-pyridyl)-1-(2-trifluoromethyl-3-cyclohexylphenyl)-2-phenylethanol,
1-(2-pyridyl)-1-(2-cycloheptyl-4-trifluoromethylphenyl)-2-phenylethanol and
1-(2-pyridyl)-1-(3-trifluoromethyl-4-fluorophenyl)-2-phenylethanol, respectively.

Example 4

When, in the procedure of Example 1, 2-pyridyl benzyl ketone is replaced by an equal molar amount of 3-pyridyl benzyl ketone and 3-trifluoromethylphenyl magnesium bromide is replaced by an equal molar amount of 2-trifluoromethylphenyl magnesium bromide, there is obtained 1 - (3 - pyridyl) - 1 - (2 - trifluoromethylphenyl) -2-phenylethanol.

Example 5

When, in the procedure of Example 1, 2-pyridyl benzyl ketone is replaced by an equal molar amount of 4-pyridyl benzyl ketone and 3-trifluoromethylphenyl magnesium bromide is replaced by an equal molor amount of 2-trifluoromethylphenyl magnesium bromide, there is obtained 1 - (4 - pyridyl) - 1 - (2 - trifluoromethylphenyl)-2-phenylethanol.

Example 6

When, in the procedure of Example 1, 2-pyridyl benzyl ketone is replaced by an equal molar amount of 3-pyridyl benzyl ketone and 3-trifluoromethylphenyl magnesium bromide is replaced by an equal molar amount of 4-trifluoromethylphenyl magnesium bromide, there is obtained 1 - (3 - pyridyl) - 1 - (4 - trifluoromethylphenyl) - 2 phenylethanol.

Example 7

When, in the procedure of Example 1, 2-pyridyl benzyl ketone is replaced by an equal molar amount of 4-pyridyl benzyl ketone and 3-trifluoromethylphenyl magnesium bromide is replaced by an equal molar amount of 4-trifluoromethylphenyl magnesium bromide, there is obtained 1 - (4 - pyridyl) - 1 - (4 - trifluoromethylphenyl) - 2-phenylethanol.

Thus, it is apparent from the foregoing description that the objects of this invention have been attained. Novel compounds have been invented which have hypocholesteremic activity. In addition, a novel method of treating hyperchloesteremia has been invented.

While this invention has been described and exemplified in terms of its preferred embodiment, those skilled in the art will appreciate that modifications can be made without departing form the spirit and scope of this invention.

What is claimed is:

1. A compound selected from the group consisting of compounds of the formula

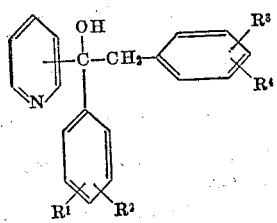

wherein
$R^1$ is trifluoromethyl;
$R^2$, $R^3$ and $R^4$ each represent a member selected from the group consisting of hydrogen, chloro, bromo, iodo, fluoro, trifluoromethyl, (lower)alkyl, (lower)alkoxy, (lower)alkylthio, di(lower)alkylamino, di(lower)alkylsulfamyl, methylenedioxy, (lower)alkanoyl, phenyl, phenoxy, benzyl and cycloalkyl radicals having from 5 to 7 carbon atoms inclusive wherein at least two of $R^2$, $R^3$ and $R^4$ are hydrogen; and a salt pharmaceutically acceptable nontoxic salt thereof.

2. A compound of the formula

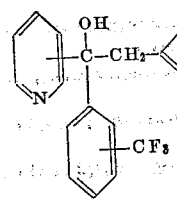

3. A compound of the formula

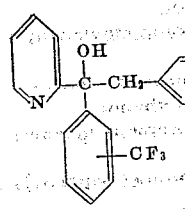

4. The compound having the formula

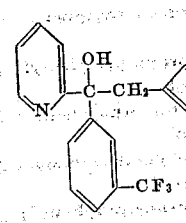

5. The compound having the formula

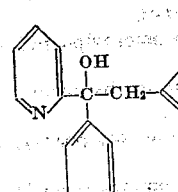

6. The compound having the formula

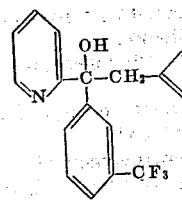

7. The compound having the formula

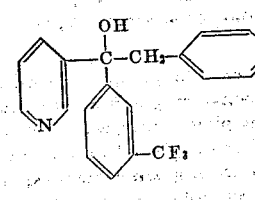

8. The compound having the formula

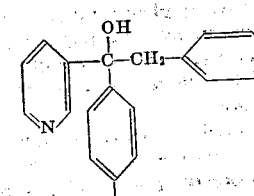

9. The compound having the formula
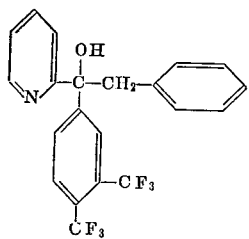
References Cited
Wright et al.: J. Med. Chem., vol. 7, pp. 113–115, January 1964, RSI. J5.
Yale: J. Med. Chem., vol. 1, pp. 121 and 130 (February 1959), RSI. J5.
HENRY R. JILES, *Primary Examiner.*
A. L. ROTMAN, *Assistant Examiner.*